United States Patent
Hashimoto

(10) Patent No.: US 12,046,766 B2
(45) Date of Patent: Jul. 23, 2024

(54) BATTERY PACK

(71) Applicant: SUBARU CORPORATION, Tokyo (JP)

(72) Inventor: Takashi Hashimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 199 days.

(21) Appl. No.: 17/221,179

(22) Filed: Apr. 2, 2021

(65) Prior Publication Data

US 2021/0320366 A1  Oct. 14, 2021

(30) Foreign Application Priority Data

Apr. 10, 2020  (JP) ................................. 2020-071144

(51) Int. Cl.
*H01M 50/242* (2021.01)
*B60K 1/04* (2019.01)

(52) U.S. Cl.
CPC .............. *H01M 50/242* (2021.01); *B60K 1/04* (2013.01); *H01M 2220/20* (2013.01)

(58) Field of Classification Search
CPC ......... H01M 50/242; B60K 2001/0405; B60K 2001/0438; B60K 2001/0416; B60K 1/04
See application file for complete search history.

(56) References Cited

U.S. PATENT DOCUMENTS

| | | | | |
|---|---|---|---|---|
| 2013/0307330 A1* | 11/2013 | Hotta | ..................... | B60L 50/60 307/10.1 |
| 2017/0240207 A1* | 8/2017 | Kido | ..................... | H01M 50/24 |
| 2017/0368959 A1* | 12/2017 | Hara | ..................... | H01M 50/242 |
| 2018/0105209 A1* | 4/2018 | Fees | ..................... | H01M 50/249 |
| 2018/0290688 A1* | 10/2018 | Kirimoto | ............. | B62D 21/152 |

FOREIGN PATENT DOCUMENTS

| | | | |
|---|---|---|---|
| JP | 2013-089448 A | | 5/2013 |
| JP | 2013089448 A | * | 5/2013 |
| JP | 2015026488 A | * | 2/2015 |
| JP | 2015-095971 A | | 5/2015 |
| JP | 2017-226347 A | | 12/2017 |

OTHER PUBLICATIONS

English translation of JP-2013089448-A (Year: 2013).*
English translation of JP-2015026488-A (Year: 2015).*
Japanese Office Action issued Aug. 18, 2023 for Japanese Patent Application No. 2020-071144 (1 page in Japanese with English translation).

* cited by examiner

*Primary Examiner* — Haroon S. Sheikh
*Assistant Examiner* — Drew C Newman
(74) *Attorney, Agent, or Firm* — Smith, Gambrell & Russell, LLP

(57) ABSTRACT

A battery pack includes a battery, a storage box, and a high voltage component. The storage box stores the battery, and includes a load transmitter. Here, the load transmitter is a component that transmits a load from a rear position to a front position in order to move the high voltage component forward at the time of a collision, the load being an impact energy generated upon a collision. The high voltage component is configured to be electrically coupled to the battery, structurally coupled to the load transmitter, and disposed forwardly of the battery within the storage box.

20 Claims, 5 Drawing Sheets

BATTERY PACK

CROSS-REFERENCE TO RELATED APPLICATIONS

The present application claims priority from Japanese Patent Application No. 2020-071144 filed on Apr. 10, 2020, the entire contents of which are hereby incorporated by reference.

BACKGROUND

The disclosure relates to a battery pack, and more particularly, to a battery pack including a battery and a high voltage component.

Electric vehicles and hybrid electric vehicles are each equipped with a high-capacity vehicle battery that supplies electric power to a motor for rotation, which provides a driving force to the vehicle. The vehicle battery has a heavy weight and a large area occupied in order to secure a sufficient continuous driving range. Therefore, the vehicle battery is disposed, for example, below a seat or below the rear floor.

Japanese Unexamined Patent Application Publication (JP-A) No. 2013-89448 describes a battery module that can protect the battery from the impact at the time of a collision of a vehicle. The battery module described in JP-A No. 2013-89448 includes a lower frame to fix the battery module, and the lower frame has a front frame, a rear frame and a side frame. In addition, the front frame and the side frame have respective flanges for tightening. These flanges for tightening may be partially overlapped so that both flanges can be fixed to the vehicle side. With this configuration, the protection effect of the battery module can be increased.

SUMMARY

An aspect of the disclosure provides a battery pack including a battery, a storage box, and a high voltage component. The storage box stores the battery, and includes a load transmitter configured to transmit a load applied upon occurrence of a collision. The high voltage component is configured to be electrically coupled to the battery, structurally coupled to the load transmitter, and disposed forwardly of the battery within the storage box.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 2A is a sectional view, and FIG. 2B is an exploded sectional view;

DETAILED DESCRIPTION

Although the disclosure described in JP-A No. 2013-89448 makes it possible to increase the effect of protection of a battery module, there is a problem in that when a vehicle collision accident occurs, accidental contact between a high voltage component such as a relay and the battery module may cause a short-circuit. Particularly, when a pole collision occurs, in other words, a collision with a pole-like object occurs at a central position of a body along the width, such a problem is noticeable.

It is desirable to provide a battery pack that, upon occurrence of a collision accident, can move the high voltage component away from the battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
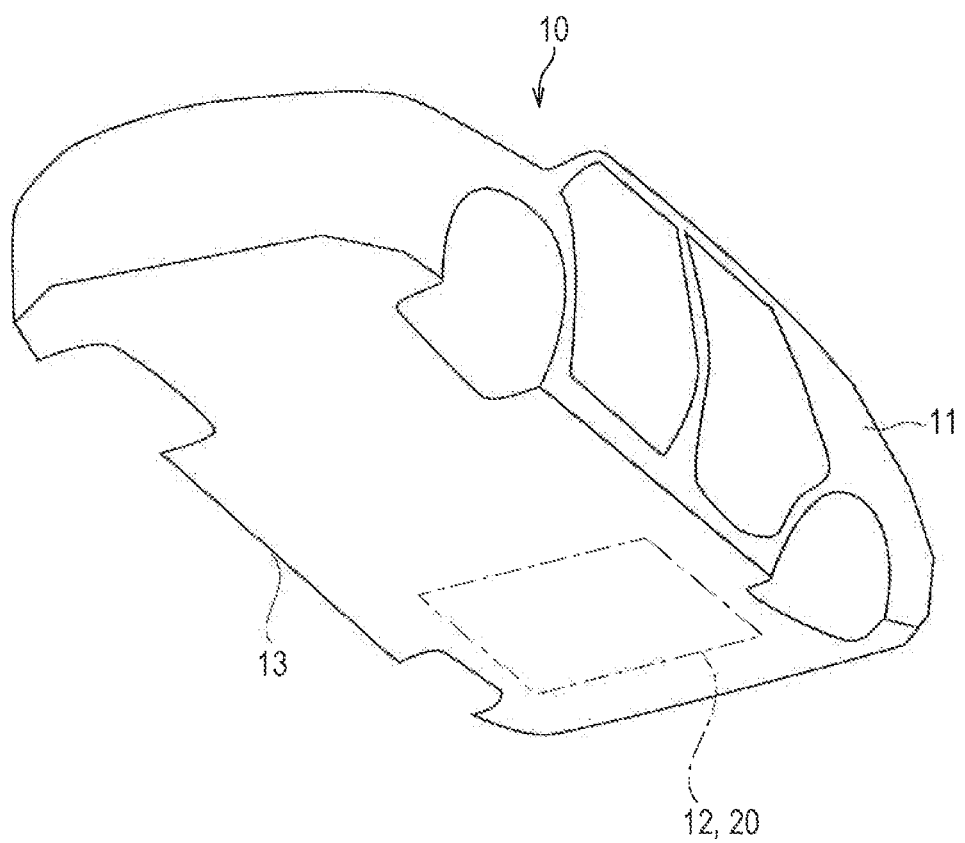
FIG. 1 is a perspective view illustrating a vehicle including a battery pack according to an embodiment of the disclosure.

FIG. 1 is a perspective view from below of a vehicle 10 including a battery pack 20 according to the embodiment of the disclosure. The vehicle 10 is, for example, an automobile or a train, and is equipped with the battery pack 20 described below to supply electric power to various electric components such as a motor. For example, the vehicle 10 is an electric vehicle (EV), a hybrid electric vehicle (HEV) or a plug-in hybrid electric vehicle (PHEV).

The vehicle 10 has a body 11, a plurality of battery packs 20 disposed on a battery disposition area 12 provided in the vicinity of a bottom surface 13 of the vehicle 10, a drive motor (not illustrated) driven by electric power supplied from the battery packs 20, and tires (not illustrated) rotated by the driving force of the drive motor.

The plurality of battery packs 20 described below are disposed in a matrix form on the battery disposition area 12. Each battery pack 20 has a substantially rectangular parallelepiped shape, for example. It is possible to increase the continuous driving range of the vehicle 10 by disposing the plurality of battery packs 20 on the battery disposition area 12 efficiently.

Figure 2A:
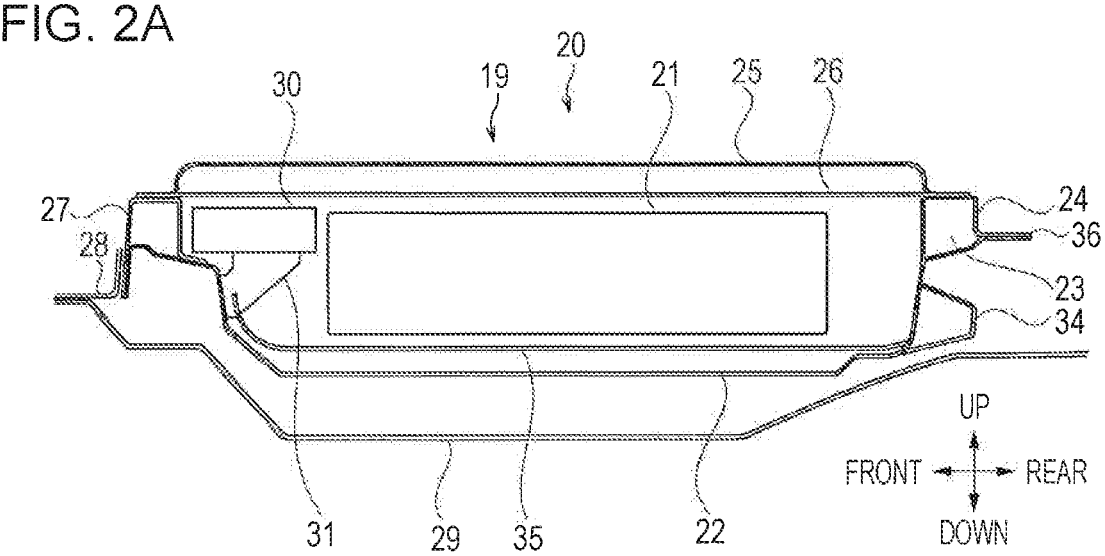
FIGS. 2A and 2B are views illustrating the battery pack according to the embodiment of the disclosure.
Figure 2B:
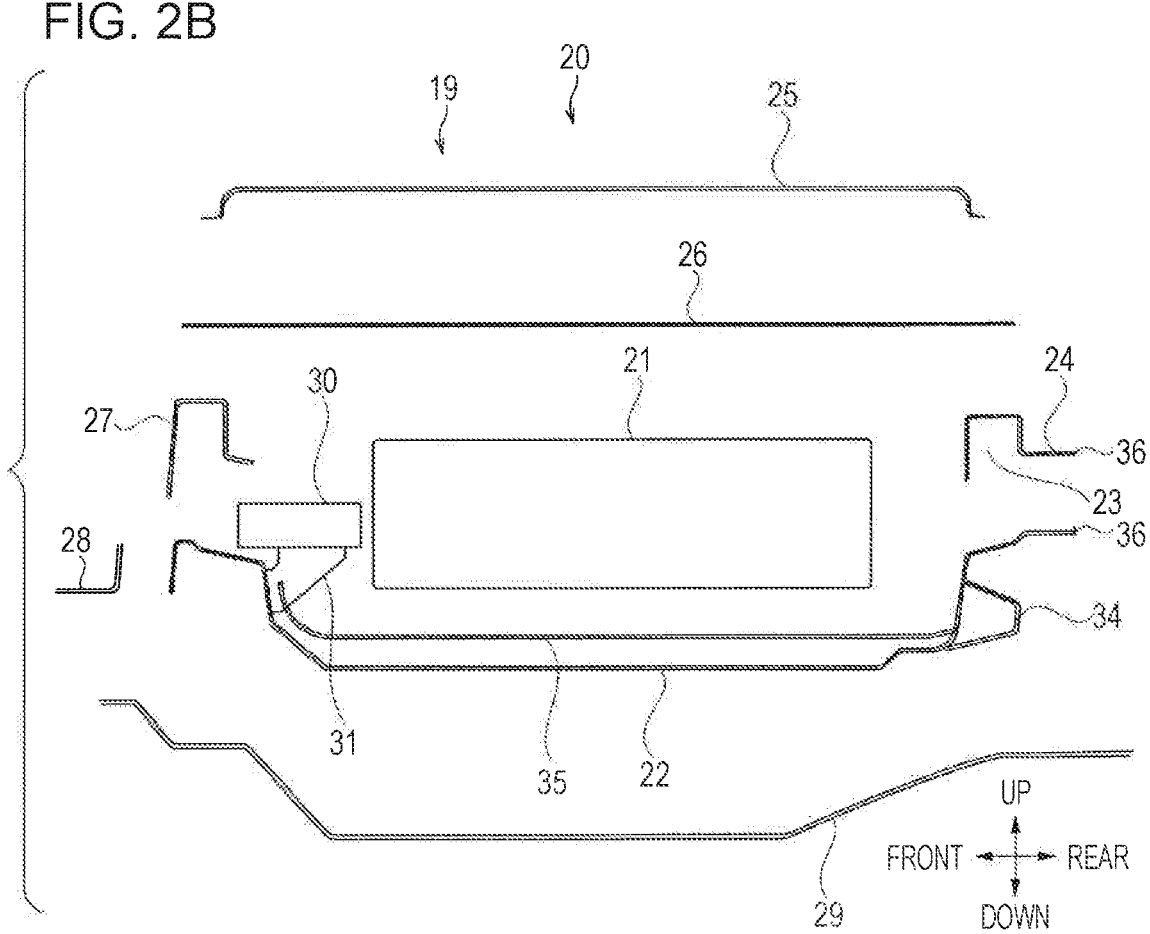
Figure 3:
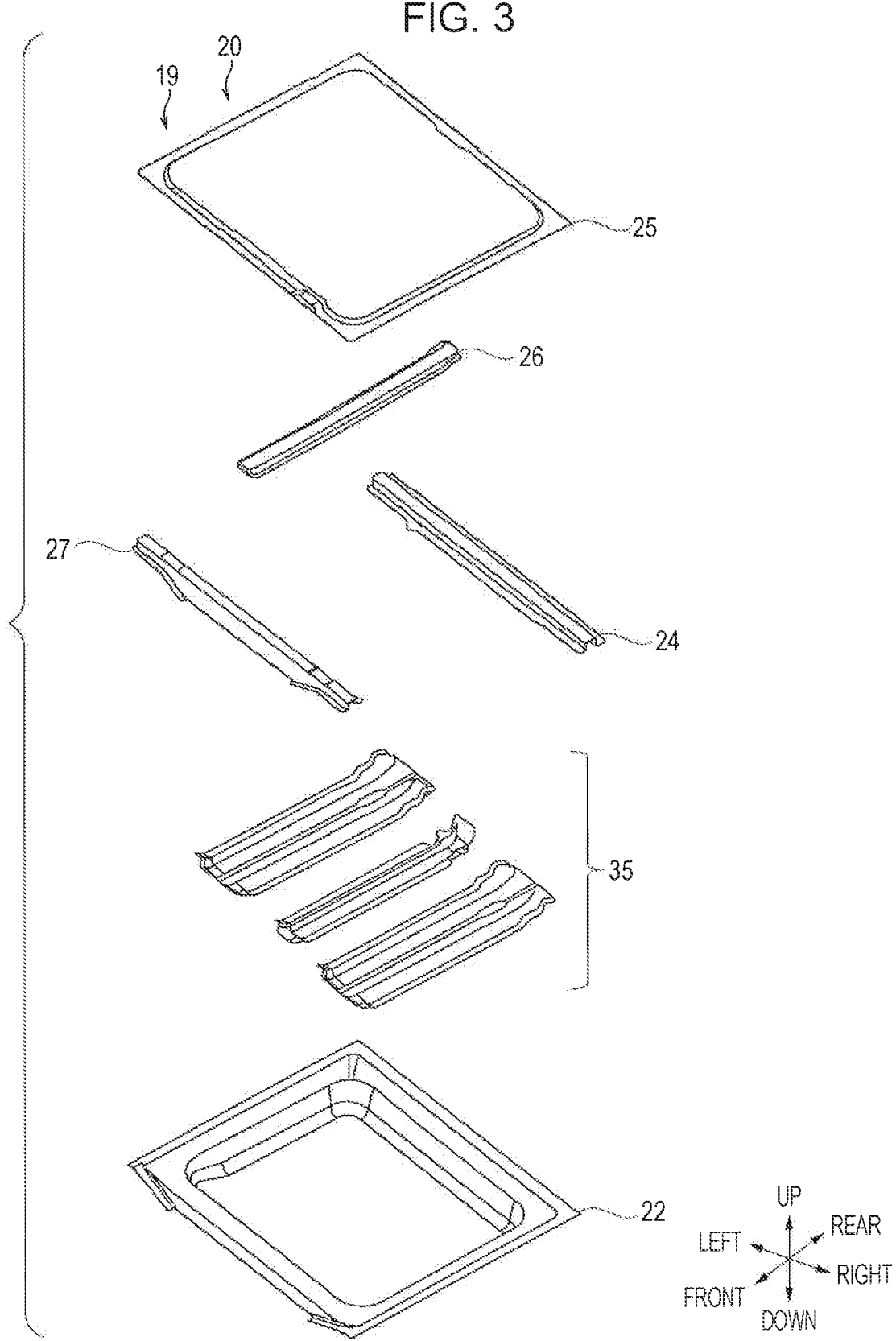
FIG. 3 is an exploded perspective view illustrating the battery pack according to the embodiment of the disclosure.

FIGS. 2A and 2B are views illustrating the battery pack 20, FIG. 2A is a sectional view, and FIG. 2B is an exploded sectional view. Here, members included in the battery pack 20 are joined to each other by welding or tightening. FIG. 3 is an exploded perspective view illustrating the battery pack 20.

Referring to FIG. 2A, the battery pack 20 primarily includes a battery 21, a storage box 19, and a high voltage component 30.

The battery 21 has a plurality of battery cells disposed in a front-rear direction with a space therebetween. For example, the battery cells are each a secondary battery such as a nickel-metal hydride battery or a lithium-ion battery, and each individual battery cell has a substantially plate shape.

The storage box 19 stores the battery 21 as well as a load transmitter that transmits the load applied upon occurrence of a pole collision forward. The load transmitter is, for example, a cover frame 26, a lower frame 35 described below. The specific configuration of the storage box 19 will be described below.

The high voltage component 30 is electrically coupled to the battery 21, structurally coupled to the load transmitter, and disposed forwardly of the battery 21. The high voltage component 30 is stored in a junction box, and allows a high voltage electric current for charging or being discharged from the battery 21 to flow. The high voltage component 30 is, for example, a relay, a fuse, a resistor, or a semiconductor for high voltage. When the high voltage component 30 comes into contact with the battery 21 upon an occurrence of a collision accident, smoke emission, fire catching, and/or current leakage may occur. In the embodiment, as described below, upon an occurrence of a collision accident, smoke emission is prevented from occurring by moving the high voltage component 30 away from the battery 21.

The storage box 19 primarily has a battery pan 22 on which the battery 21 is placed, and a battery box cover 25 that covers the battery 21 from above. As illustrated in FIG. 3, the battery box cover 25 blocks the upper surface opening of the battery pan 22. The storage box 19 is disposed on the upper surface of a body floor 29 as illustrated in FIG. 2A. Also, the front end, which is a center position of the vehicle along the width, of the storage box 19 is coupled to the body floor 29 via a battery box bracket 28.

An upper projection 23 is a member that projects rearwardly from an upper position of the rear face of the storage box 19. As illustrated in FIG. 2B and FIG. 3, the upper projection 23 is formed by a rear battery frame 24 which is shaped in a curved form having an opening downward. In addition, the upper projection 23 is formed as a closed section at a rear part of the storage box 19. Thus, at the time of a collision, the load can be absorbed by deformation of the upper projection 23. Furthermore, at the time of a collision, the load is transmitted to the cover frame 26 through the upper projection 23, thereby making it possible to move the high voltage component 30 forward as described below.

A lower projection 34 is a member that projects rearwardly from the battery pan 22 which is part of the storage box 19. The lower projection 34 is composed of a member different from that of the battery pan 22, and forms a closed section. Thus, at the time of a collision, the load can be absorbed by deformation of the lower projection 34. Furthermore, at the time of a collision, the load is transmitted to the lower frame 35 and the battery pan 22 through the lower projection 34, thereby making it possible to move the high voltage component 30 forward as described below.

The body floor 29 has, at an upper position of the front end thereof, a front battery frame 27 that is a closed section. As illustrated in FIG. 2B, the front battery frame 27 is composed of a member obtained by bending processing so as to have an opening downward, and the member is different from that of the battery box cover 25 and the battery pan 22. Since the front battery frame 27 is provided, when a collision accident occurs, the front battery frame 27 is deformed to a substantially parallelogram, thereby making it possible to move the high voltage component 30 forward further appropriately.

A high voltage component bracket 31 is a coupling member that fixes the high voltage component 30 to the front end side of the battery pan 22.

In the embodiment, the cover frame 26 and the lower frame 35 are primarily provided as the load transmitter. Here, the load transmitter is a component that transmits a load from a rear position to a front position in order to move the high voltage component 30 forward at the time of a pole collision, the load being an impact energy generated upon a pole collision.

As illustrated in FIG. 3, the cover frame 26 and the lower frame 35 are designed to have a higher rigidity than that of other members included in the battery pack 20 by forming a rib in a front-rear direction. Also, the front ends of the cover frame 26 and the lower frame 35 are disposed forwardly of the front end of the battery 21, and the rear ends of the cover frame 26 and the lower frame 35 are disposed rearwardly of the rear end of the battery 21. This configuration makes it possible to prevent crash deformation of the battery 21 due to a load when a pole collision occurs.

The cover frame 26 is a member which is higher in rigidity than the battery pan 22 and the battery box cover 25 included in the storage box 19. As illustrated in FIG. 3, the cover frame 26 is a substantially elongated plate-like member extending in a front-rear direction. The cover frame 26 is disposed between the battery box cover 25 and the battery 21. Referring to FIG. 2A, the front end side of the cover frame 26 is coupled to the front end of the storage box 19, and structurally coupled to the high voltage component 30. Here, the front end side of the cover frame 26 is structurally coupled to the high voltage component 30 via the front battery frame 27, the front end of the battery pan 22 and the high voltage component bracket 31. The rear end side of the cover frame 26 is coupled to the rear end of the storage box 19; the rear end of the cover frame 26 is joined between the rear end of the battery box cover 25 and the upper surface of the rear battery frame 24. The cover frame 26 is higher in rigidity than other members included in the storage box 19, for example, the battery box cover 25 and the battery pan 22, thus the degree of deformation in a front-rear direction at the time of occurrence of a collision accident is low. Therefore, the load applied from a rear position at the time of a collision can be transmitted to the high voltage component 30 side in an upper area of the storage box 19, and the high voltage component 30 can be moved forward.

The lower frame 35 is a rigid member that extends at a lower position within the battery pan 22 from the rear end side to the front end side of the battery pan 22. The front end of the lower frame 35 is joined to the front end of the battery pan 22. In addition, the rear end of the lower frame 35 is joined to the rear face of the battery pan 22 and the lower projection 34. The front end of the lower frame 35 is structurally joined to the high voltage component 30 via the front end area of the battery pan 22 and the high voltage component bracket 31. The lower frame 35 is higher in rigidity than other members included in the storage box 19, for example, the battery box cover 25 and the battery pan 22, thus the degree of deformation in a front-rear direction at the time of occurrence of a collision accident is low. Also, as illustrated in FIG. 3, the lower frame 35 includes three plate-like members extending in a front-rear direction. Therefore, the load applied from a rear position at the time of a collision can be transmitted to the high voltage component 30 side by the lower frame 35 in a lower area of the storage box 19, and the high voltage component 30 can be moved forward.

Referring to FIGS. 4A to 4C and FIGS. 5A to 5C, the motion of the battery pack 20 upon occurrence of a pole collision will be described. FIGS. 4A to 4C and FIGS. 5A to 5C are sectional views illustrating the case where a pole collision occurs at the rear of a vehicle. In FIGS. 4A to 4C and FIGS. 5A to 5C, the front face of the pole of collision is illustrated by a dashed-dotted line.

Figure 4A:
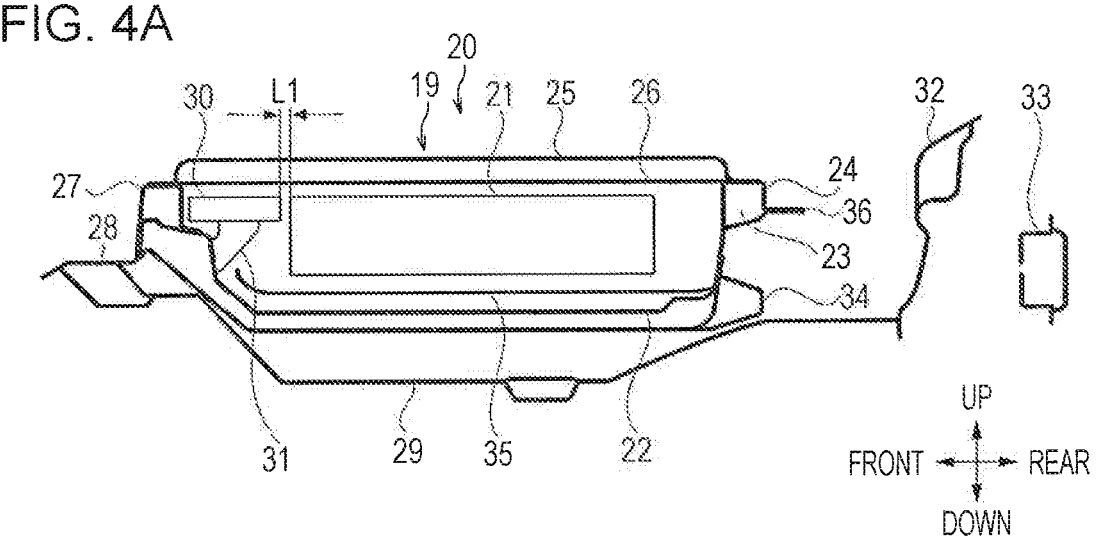
FIGS. 4A, 4B and 4C are views illustrating the battery pack according to the embodiment of the disclosure, specifically, sectional views illustrating the case where the rear of a vehicle collides with a pole.

Referring to FIG. 4A, the configuration of the battery pack 20 and its peripheral region will be described. A rear skirt 32 is disposed at a rear position of the battery pack 20. In addition, a bumper beam 33 is disposed at a further rear position of the rear skirt 32. When no pole collision has occurred, the distance L1 between the high voltage component 30 and the battery 21 is 10 mm, for example.

Figure 4B:
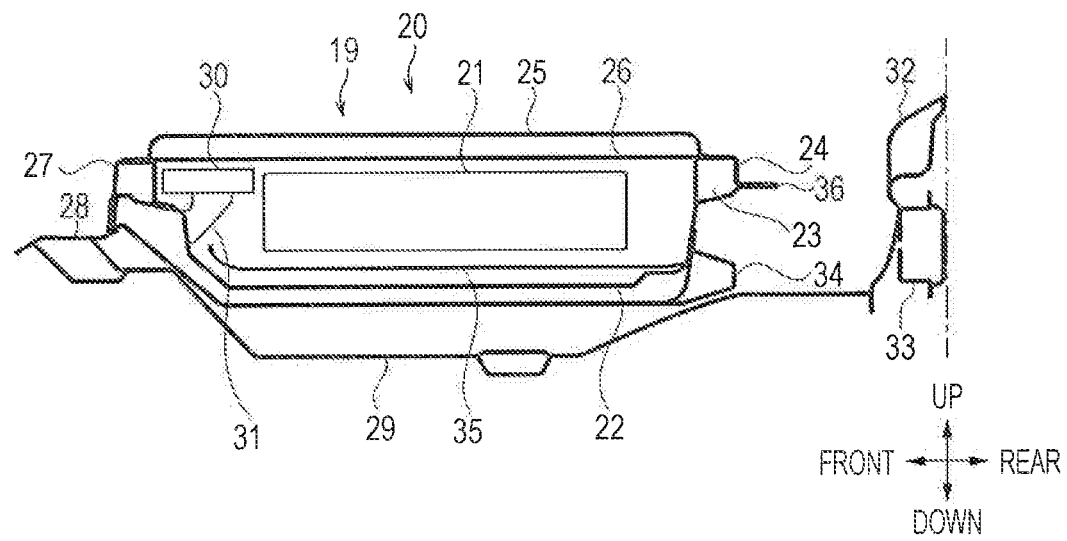

Referring to FIG. 4B, when a pole collision occurs, the pole collides with the bumper beam 33 which is deformed and displaced forward. FIG. 4B illustrates the situation where the bumper beam 33 is displaced to a position immediately below the rear skirt 32. At this point, the rear face part of the bumper beam 33 has been deformed due to the pole collision.

Figure 4C:
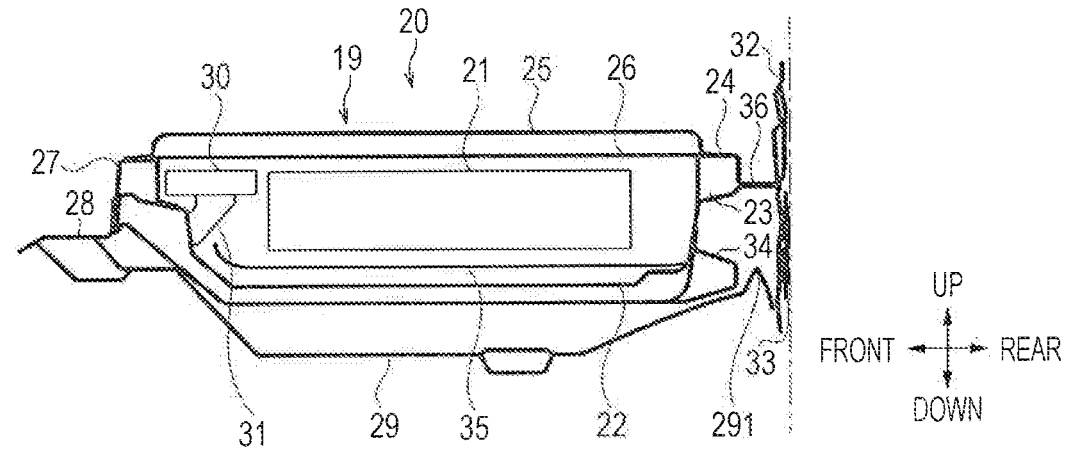

Referring to FIG. 4C, at this point, the pole has entered the vicinity of the rear end of the battery pack 20. Accordingly, the bumper beam 33 cannot maintain its original sectional shape, and has been deformed like a single plate. In addition, the rear skirt 32 also cannot maintain its original sectional shape, and has been deformed like a single plate. At this point, an end 291 of the body floor 29 is bent in an inverted "V" character shape at a rear position of the battery pack 20.

Figure 5A:
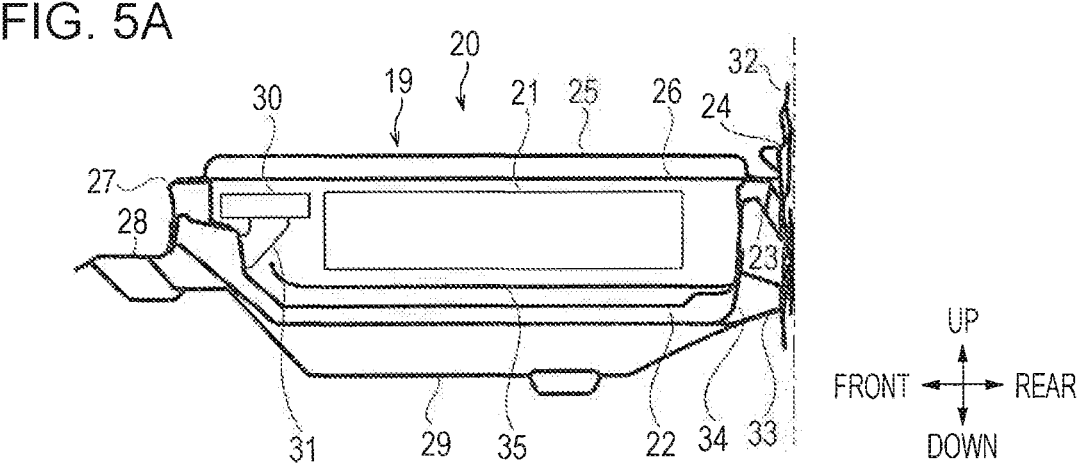
FIGS. 5A, 5B and 5C are views illustrating the battery pack according to the embodiment of the disclosure, specifically, sectional views illustrating the case where the rear of a vehicle collides with a pole.

Referring to FIG. 5A, the pole further moves forward, and enters the section of the upper projection 23. At this point, the upper projection 23 has already failed to maintain its original sectional shape. Also, between the members constituting the battery pack 20, the member that extends to the most rearward position is a plate-like member 36 (see FIG. 4C) which extends rearward from the upper projection 23. Thus, when a pole collision occurs, the plate-like member 36 (see FIG. 4C) and the upper projection 23 are deformed before the lower projection 34 is deformed, and the load applied due to the deformation of the upper projection 23 is transmitted to the front battery frame 27 that is positioned forward through the battery box cover 25 and the cover frame 26. Thus, at this point, the front battery frame 27 has been deformed to a parallelogram. In addition, in the state illustrated in FIG. 5A, the pole is in contact with the rear face of the lower projection 34.

Figure 5B:
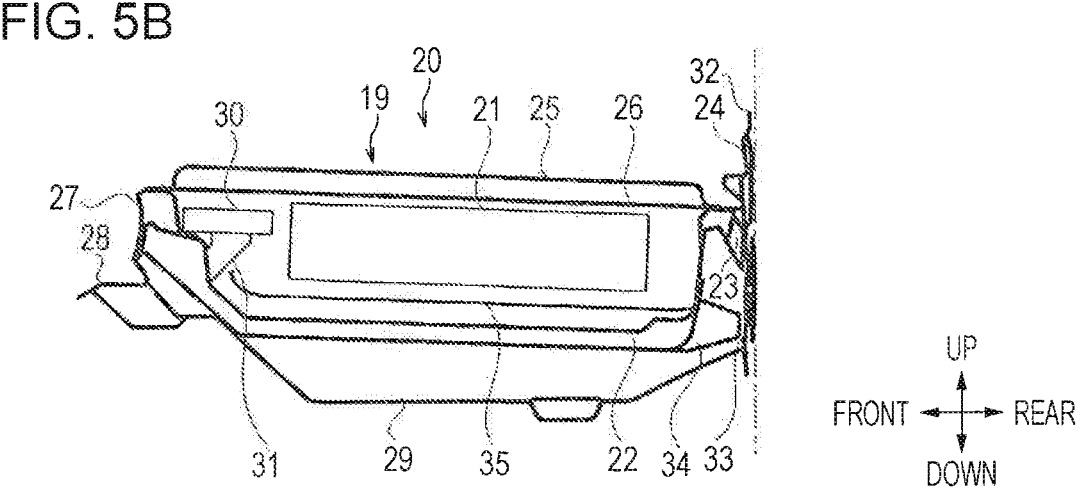

Referring to FIG. 5B, the pole further moves forward, thus the pole collision presses against the lower projection 34 forward. Consequently, the load is transmitted through the lower projection 34 and the lower frame 35, and is transmitted to the front part of the storage box 19. As a result, the front lower end part of the storage box 19 bumps into the body structure (not illustrated here), then is raised upward. Thus, the storage box 19 exhibits a slant state in which the left part thereof is displaced upward.

Figure 5C:
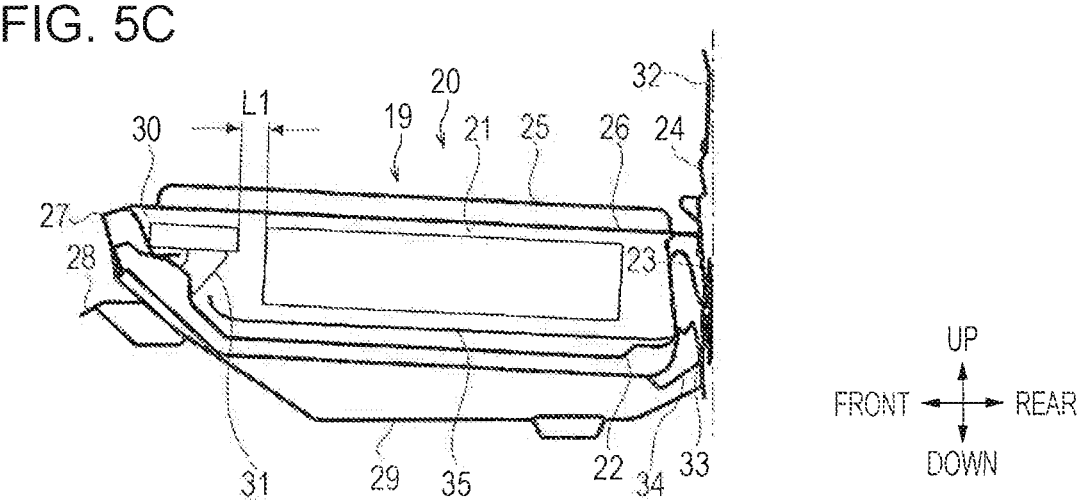

Referring to FIG. 5C, when the pole further moves forward, the rear part of the storage box 19 is deformed. In other words, the rear parts of the battery pan 22 and the battery box cover 25 are deformed. In addition, the cover frame 26 further transmits the load forward, thus the front battery frame 27 is pushed forward. Accordingly, the high voltage component 30 structurally coupled to the cover frame 26 via the front battery frame 27, the front part of the battery pan 22 and the high voltage component bracket 31 is also displaced forward.

Also, at a lower position of the storage box 19, the lower projection 34 is pushed by the pole, thus the box section of the lower projection 34 has been crashed. Furthermore, the battery pan 22 and the body floor 29 are pulled by the load transmitted forward through the lower frame 35, thus are extended flat. Such deformation also makes it possible to move the high voltage component 30 forward, which is attached to the front end of the battery pan 22 via the high voltage component bracket 31.

As described above, the load applied at the time of a pole collision is transmitted forward through the cover frame 26 and the lower frame 35, thereby making it possible to move the high voltage component 30 away from the battery 21. Here, the distance L1 between the high voltage component 30 and the battery 21 is, for example, 18.8 mm which is ensured to be longer than the distance L1 in the state illustrated in FIG. 4A, in which no pole collision has occurred. Therefore, it is possible to prevent an accidental short-circuit or the like due to contact between the high voltage component 30 and the battery 21.

According to the embodiment described above, the following primary effects can be achieved.

Referring to FIG. 5C, the high voltage component 30 and the load transmitter (the cover frame 26 or the lower frame 35) are structurally coupled to each other. Thus, when a collision accident occurs, it is possible to move the high voltage component 30 away from the battery 21, and to prevent a short-circuit therebetween.

Referring to FIG. 2A, the cover frame 26 extends from the front end to the rear end of the storage box 19, thus when a collision accident occurs, it is possible to protect the battery 21 by the storage box 19 with high rigidity. Furthermore, when a collision accident occurs, the high voltage component 30 can be moved away from the battery 21 by moving the high voltage component 30 forward by the cover frame 26.

Referring to FIG. 2A, the cover frame 26 is coupled above the upper projection 23. Thus, when a collision occurs, the load can be transmitted forward using the cover frame 26, and the high voltage component 30 can be moved forward, and moved away from the battery 21.

Referring to FIG. 2B, the upper projection 23 is formed by the rear battery frame 24 which is a member different from the battery box cover 25 and the battery pan 22. Thus, the box shape of the upper projection 23 can be achieved by a simple configuration.

Referring to FIG. 5B, the high voltage component 30 is disposed on the front end side of the battery pan 22 with the high voltage component bracket 31 interposed therebetween. Thus, when a collision occurs, the high voltage component 30 can be displaced forward.

Referring to FIG. 5C, when a collision occurs, the impact can be absorbed by deformation of the lower projection 34. Furthermore, it is also possible to displace the high voltage component 30 forward via the lower projection 34 and the lower frame 35, and to move the high voltage component 30 away from the battery 21.

Referring to FIG. 5C, when a collision occurs, the lower frame 35 provides the reaction force to the impact, thereby making it possible to protect the battery 21 from the impact. Furthermore, it is also possible to displace the high voltage component 30 forward via the lower frame 35, and to move the high voltage component 30 away from the battery 21.

Although the embodiment of the disclosure has been described above, the present disclosure is not limited to this, and modifications may be made within a range without departing from the spirit of the present disclosure. In addition, it is possible to mutually combine the embodiments described above.

The invention claimed is:

1. A battery pack comprising:
   a battery;
   a storage box having an upper battery box cover and a lower battery pan upon which the battery is placed such that the storage box stores the battery; and
   a high voltage component,
   a load transmitter configured to transmit a load applied upon occurrence of a collision, and
   the high voltage component is configured to be electrically coupled to the battery, structurally coupled to the load transmitter, and disposed forwardly of the battery within the storage box, and
   wherein the load transmitter includes a cover frame that is positioned as to extend in a front-to-rear direction below the upper battery box cover and along and above the battery, and wherein the cover frame is more rigid, relative to a force directed in the rear-to-front direction, than the upper battery box cover, and wherein there is a forward-to-rearward gap spacing (L1) between the battery and the high voltage component, and wherein the load transmitter is configured such that the gap spacing between the battery and high voltage component increases upon a rear-to-front impact loading on the battery pack.

2. The battery pack according to claim 1,
   wherein the cover frame is also positioned as to extend in a front-to-rear direction below the upper battery box cover and along and above the high voltage component, and
   wherein a front end side of the cover frame is joined to a front end of the storage box and structurally coupled to the high voltage component, and a rear end side of the cover frame is joined to a rear end of the storage box.

3. The battery pack according to claim 2,
   wherein, at an upper position of a rear face of the storage box, an upper projection rearwardly projects,
   the cover frame is joined to a position of the rear face of the storage box, the position being above the upper projection, and
   the battery pack further comprises a lower projection which rearwardly projects away from a lower area of the rear face of the storage box.

4. The battery pack according to claim 3,
   wherein the upper projection comprises a rear battery frame disposed between the battery box cover and the battery pan.

5. The battery pack according to claim 2, further comprising
   a lower frame that is a rigid member extending at a lower position within the battery pan from a rear end side to a front end side of the battery pan.

6. The battery pack according to claim 3, further comprising
   a lower frame that is a rigid member extending at a lower position within the battery pan from a rear end side to a front end side of the battery pan.

7. The battery pack according to claim 4, further comprising
   a lower frame that is a rigid member extending at a lower position within the battery pan from a rear end side to a front end side of the battery pan.

8. The battery pack according to claim 1, wherein there is a gap between an under surface of the upper battery box cover and an upper surface of the cover frame.

9. The battery pack according to claim 1, further comprising a rear battery frame that extends more rearward than a rearward most part of the upper battery box cover, and the cover frame being secured at a rearward end to the rear battery frame such that a rear-to-front collision load on the battery pack is directed first to the rear battery frame and then along the cover frame.

10. The battery pack according to claim 9, wherein the rear battery frame has a recess configuration that facilitates collapse deformation upon collision load impact.

11. The battery pack according to claim 10, further comprising a front battery frame that extends more forward than a forward most part of the upper battery box cover, and the cover frame being secured at a forward end to the front battery frame, and wherein the front battery frame has a recessed configuration that facilitates collapse deformation upon collision load impact as to enable forward shifting of the high voltage component to a greater extent than the battery.

12. The battery pack according to claim 1, wherein the load transmitter further comprises a lower frame that is positioned as to extend in a front-to-rear direction below the battery and above the battery pan, and wherein the lower frame is more rigid, relative to a force directed in the rear-to-front direction, than the battery pan.

13. The battery pack according to claim 12, further comprising a deformable lower projection that extends rearward from a rear region of the battery pan and is positioned at a height level in common with the lower frame such that a rear-to-front collision load on the deformable lower projection is directed along the lower frame from the deformable lower projection.

14. The battery pack according to claim 9, wherein the load transmitter further comprises a lower frame that is positioned as to extend in a front-to-rear direction below the battery and above the battery pan, and wherein the lower frame is more rigid, relative to a force directed in the rear-to-front direction, than the battery pan, and the battery pack further comprising a deformable lower projection that extends rearward from a rear region of the battery pan and is positioned at a height level in common with the lower frame such that a rear-to-front collision load on the deformable lower projection is directed along the lower frame.

15. The battery pack according to claim 14, wherein the deformable lower projection extends less rearward than the rear battery frame as to provide for a sequenced collision impact force transmittal, first along the cover frame and then along the lower frame.

16. A battery pack comprising:
   a battery;
   a storage box having an upper battery box cover and a lower battery pan upon which the battery is placed such that the storage box stores the battery; and
   a high voltage component,
   a load transmitter that is positioned as to also be stored within the storage box, and
   the high voltage component is configured to be electrically coupled to the battery, structurally coupled to the load transmitter, and disposed forwardly of the battery within the storage box, and
   wherein the load transmitter includes a cover frame that extends along and above the battery and below the upper battery box cover, and is more rigid, relative to a rear-to-front directed load, than is the battery box cover such that the load transmitter is configured as to increase the spacing between the high voltage component and the battery upon a rear-to-front impact loading on the battery pack.

17. The battery pack according to claim 16, further comprising a rear battery frame that extends more rearward than a rearward most part of the upper battery box cover, and the cover frame being secured at a rearward end to the rear battery frame such that a rear-to-front collision load on the battery pack is directed first to the rear battery frame and then along the cover frame, and wherein the rear battery frame has a recess configuration that facilitates collapse deformation upon collision load impact.

18. The battery pack according to claim 17, further comprising a front battery frame that extends more forward than a forward most part of the upper battery box cover, and the cover frame being secured at a forward end to the front battery frame, and wherein the front battery frame has a recessed configuration that facilitates collapse deformation upon collision load impact as to enable forward shifting of the high voltage component to a greater extent than the battery.

19. The battery pack according to claim 16, wherein the cover frame is a rigid beam having a lesser left-to-right width extension than the upper battery box cover, and wherein the rigid beam extends between the front and rear interior ends of the storage box and is spaced below an under surface of the upper battery box cover.

20. A battery pack comprising:
a battery;
a storage box having an upper battery box cover and a lower battery pan upon which the battery is placed such that the storage box stores the battery; and
a high voltage component,
a load transmitter configured to transmit a load applied upon occurrence of a collision, and
the high voltage component is configured to be electrically coupled to the battery, structurally coupled to the load transmitter, and disposed forwardly of the battery within the storage box, and
wherein the load transmitter includes a cover frame that is positioned as to extend in a front-to-rear direction below the upper battery box cover and along and above the battery, and wherein the cover frame is more rigid, relative to a force directed in the rear-to-front direction, than the upper battery box cover wherein the load transmitter further comprises a lower frame that is positioned as to extend in a front-to-rear direction below the battery and above the battery pan, and wherein the lower frame is more rigid, relative to a force directed in the rear-to-front direction, than the battery pan, and the battery pack further comprising a bracket secured to the battery pan and extending as to support the high voltage component, and wherein the lower frame is also connected at a forward end to the bracket as to direct the high voltage component forward away from the battery upon a collision load being directed along the lower frame.

* * * * *